(12) United States Patent
Dan et al.

(10) Patent No.: US 12,537,779 B2
(45) Date of Patent: Jan. 27, 2026

(54) COMPUTER-IMPLEMENTED MULTI-USER MESSAGING APPLICATION

(71) Applicant: Microsoft Technology Licensing, LLC, Redmond, WA (US)

(72) Inventors: Ovidiu Dan, Redmond, WA (US); Ondřej Starosta, Zdimerice (CZ); Guilherme Iscaro De Godoy, Prague (CZ); Michal Hanzlik, Prague (CZ); Prateek Tiwari, Sammamish, WA (US); Muhammad Saad Sadiq, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/478,945

(22) Filed: Sep. 29, 2023

(65) Prior Publication Data
US 2024/0305589 A1    Sep. 12, 2024

Related U.S. Application Data

(60) Provisional application No. 63/451,547, filed on Mar. 10, 2023.

(51) Int. Cl.
*H04L 51/02* (2022.01)
*H04L 51/04* (2022.01)
*H04L 51/216* (2022.01)

(52) U.S. Cl.
CPC .............. *H04L 51/02* (2013.01); *H04L 51/04* (2013.01); *H04L 51/216* (2022.05)

(58) Field of Classification Search
None
See application file for complete search history.

(56) References Cited

U.S. PATENT DOCUMENTS

| 10,708,216 | B1 | 7/2020 | Rao |
| 11,200,506 | B2* | 12/2021 | Wu .......................... G06F 40/30 |
| 11,233,756 | B2* | 1/2022 | Wu ....................... H04L 51/046 |
| 11,683,283 | B2* | 6/2023 | Hansmann ............ H04L 51/046 |
| | | | 709/206 |

(Continued)

OTHER PUBLICATIONS

International Search Report and Written Opinion received for PCT Application No. PCT/US2024/018578, Jun. 5, 2024, 14 pages.

(Continued)

*Primary Examiner* — Quang N Nguyen
(74) *Attorney, Agent, or Firm* — CALFEE, HALTER & GRISWOLD LLP

(57) ABSTRACT

A computing system includes a processor; and memory storing instructions that, when executed by the processor, cause the processor to perform several acts. The acts include receiving multiple messages from multiple users in a messaging application that supports group conversations, where the multiple messages are included in a group conversation. The acts also include providing a prompt to a generative model, where the prompt includes the multiple messages. The acts additionally include receiving, from the generative model, an output generated by the generative model based upon the prompt and including the output as a turn in the group conversation.

21 Claims, 8 Drawing Sheets

(56) References Cited

U.S. PATENT DOCUMENTS

| | | | | |
|---|---|---|---|---|
| 11,689,484 | B2* | 6/2023 | Moon | G06N 20/00 |
| | | | | 709/206 |
| 11,769,017 | B1* | 9/2023 | Gray | G06F 40/56 |
| | | | | 704/9 |
| 11,847,578 | B2* | 12/2023 | Polleri | G06F 16/2423 |
| 11,960,514 | B1* | 4/2024 | Taylert | G06F 16/3329 |
| 11,978,271 | B1* | 5/2024 | Kharbanda | G06V 20/20 |
| 12,010,076 | B1* | 6/2024 | Andrew | H04L 51/02 |
| 2019/0188590 | A1* | 6/2019 | Wu | G06F 40/30 |
| 2020/0287856 | A1 | 9/2020 | Price | |
| 2021/0209121 | A1 | 7/2021 | Liu | |
| 2022/0214845 | A1* | 7/2022 | Ohashi | H04L 51/02 |
| 2023/0403244 | A1 | 12/2023 | Blandin | |
| 2024/0144565 | A1* | 5/2024 | Alkalay | G06T 11/60 |
| 2024/0202452 | A1* | 6/2024 | Schillace | G06N 3/0475 |
| 2024/0249318 | A1 | 7/2024 | Spiegel | |
| 2024/0291779 | A1* | 8/2024 | Catalano | H04L 51/52 |
| 2024/0356871 | A1 | 10/2024 | Brewer | |
| 2024/0362697 | A1* | 10/2024 | Williams | G06Q 30/0631 |
| 2024/0386313 | A1* | 11/2024 | Pedersen | G06N 20/00 |

OTHER PUBLICATIONS

Non-Final Office Action mailed on Feb. 12, 2025, in U.S. Appl. No. 18/732,534, 19 pages.

International Preliminary Report on Patentability received for PCT Application No. PCT/US2024/018578, mailed on Sep. 18, 2025, 08 pages.

* cited by examiner

PROMPT

CONTEXT FOR USER

BOT IS IN A GROUP CONVERSATION WITH OTHERS.
PARTICIPANTS IN THE CONVERSATION ARE: USER 1; USER 2; USER 3
BELOW IS THE CONVERSATION THAT HAS OCCURRED

TIME 1: USER 1 SAID: XXX XXXXXX XXXXXXXXX XXX XXXXXXXXX
TIME 2: USER 2 SAID: XXXXX XXXXXXXX XXXXXXX XXXXXXX
TIME 3: USER 3 SAID: XXXXXXXXX XXXXX XXXXXXXXXXXXXXX
TIME 4: USER 1 SAID: XXXXX XXXXXXXXXX XXXXXXXXXXX
TIME 5: USER 3 SAID: XXXX XXXXXXXXXXXX XXXXXXXXXXXX

THE CURRENT USER SPEAKING IS: USER 2
THE LOCATION OF THE CURRENT USER SPEAKING IS: LOCATION 1

[BOT INSTRUCTIONS FOR RESPONDING]

TIME AT THE START OF THE CONVERSATION IS: TIME 0

USER MESSAGE: @BOT: XXXXXXXX XXXXXXXXX XXXXXXXXXX
XXXXXXXXX XXXXXXX XXXXX

FIG. 4

PROMPT

CONTEXT FOR USER

BOT IS IN A GROUP CONVERSATION WITH OTHERS.
PARTICIPANTS IN THE CONVERSATION ARE: USER 1; USER 2; USER 3
BELOW IS THE CONVERSATION THAT HAS OCCURRED

TIME 1: USER 1 SAID:  XXX XXXXXX XXXXXXXXX XXX XXXXXXXXX
TIME 2: USER 2 SAID: XXXXX XXXXXXXX XXXXXXX XXXXXXX
TIME 3: BOT SAID: [REDACTED]
TIME 4: USER 3 SAID: XXXXXXXXX XXXXX XXXXXXXXXXXXXXX
TIME 5: BOT SAID: [REDACTED]
TIME 6: USER 1 SAID: XXXXX XXXXXXXXX XXXXXXXXXXX
TIME 7: BOT SAID: XXX XXXXXXXXX XXXXXXXX XXXXXXX
TIME 8: USER 3 SAID: XXXX XXXXXXXXXXXX XXXXXXXXXXXXX

THE CURRENT USER SPEAKING IS: USER 2
THE LOCATION OF THE CURRENT USER SPEAKING IS: LOCATION 1

[BOT INSTRUCTIONS FOR RESPONDING]

TIME AT THE START OF THE CONVERSATION IS: TIME 0

USER MESSAGE: @BOT: XXXXXXXX XXXXXXXXX XXXXXXXXXXX
XXXXXXXXX XXXXXXXX XXXXXX

FIG. 5

COMPUTER-IMPLEMENTED MULTI-USER MESSAGING APPLICATION

RELATED APPLICATION

This application claims priority to U.S. Provisional Patent Application No. 63/515,547, filed on Mar. 10, 2023, and entitled "COMPUTER-IMPLEMENTED MULTI-USER MESSAGING APPLICATION WITH AI BOT." The entirety of this application is incorporated herein by reference.

BACKGROUND

There are various types of computer-implemented messaging applications that allow for multiple users of multiple client computing devices to participate in a group conversation with one another (synchronously and/or asynchronously). Examples of computer-implemented messaging applications include, but are not limited to, text messaging applications, instant messaging applications, unified communications (UC) applications, amongst others.

Relatively recently, generative models have been developed, where generative models include generative language models (GLMs) (also referred to as large language models (LMS)), models that generate images based upon input (where the input may be text, voice, an image, etc.), models that generate video based upon input, and so forth. An example of a GLM is the Generative Pre-trained Transformer 4 (GPT-4) model. Another example of a GLM is the BigScience Large Open-science Open-access Multilingual language (BLOOM) model, which is also a transformer-based model. Briefly, a generative model is configured to generate an output (such as text in human-readable language, source code, music, video, and the like) based upon a prompt provided as input to the generative model, where the generative model generates the output in near real-time (e.g., within a few seconds of receiving the prompt).

Computer-implemented applications are being developed to incorporate generative models. For example, a generative model has been incorporated into a chat application, where a single user may interact with the generative model by way of the chat application. Accordingly, the (single) user sets forth input to the chat application and the generative model generates an output based upon such input and presents the output to the user. Conventional generative models, however, are designed to interact with a single user, and the design of such generative models has prevented them from being incorporated into computer-implemented messaging applications that support group conversations. For example, a conventional generative model maintains a conversation context between the user and the generative model throughout a conversation between the user and the generative model. The conventional generative model is unable to maintain a conversation context in a group conversation, because (due to the design of the generative model), the generative model is unable to disambiguate between different users participating in the conversation.

SUMMARY

The following is a brief summary of subject matter that is described in greater detail herein. This summary is not intended to be limiting as to the scope of the claims.

Various technologies are described herein that pertain to incorporating generative models into computer-implemented messaging applications that support group messaging (messaging between at least two participants). Computer-implemented messaging applications include text messaging applications, instant messaging applications, unified communications applications, and other applications that support synchronous messaging between participants in a group conversation (a computer-implemented messaging application can also support asynchronous messaging).

In an example, a server computing system receives multiple messages from multiple participants in a group conversation. A message in the multiple messages may include text, an image, audio (e.g., music, voice input, etc.), a video, or other computer-readable input that can be processed by a generative model. The generative model generates an output based upon the multiple messages from the multiple participants. The output can include text, an image, a video, audio, or the like.

There are various approaches that can be employed to allow the generative model to generate output based upon the multiple messages. In an example, a computer-implemented messaging application (by way of which a group conversation is being conducted) constructs a prompt and provides the prompt to the generative model, where the prompt identifies, for example, that the conversation is a group conversation that includes multiple users, includes identities of users in the group conversation, and further includes multiple messages from the group conversation (with each message identifying a user who generated the message). The generative model then generates the output based upon the prompt. In another example, the generative model is trained to inherently recognize multi-user conversations.

Incorporating a generative model into a computer-implemented messaging application that supports group messaging enables numerous use cases that have heretofore been unavailable. For example, the generative model can summarize the group conversation, can identify inputs of a particular user with respect to a topic, can propose follow-up actions based upon the group conversation, can assist with scheduling events for participants in the group conversation, can assist with coordinating schedules of users in the group conversation, can generate graphics that are unique to the group conversation (such as an image, avatars, memes, and so forth), can assist with rewriting and checking content of the group conversation (e.g., modify the conversation such that messages therein are more professional, more humorous, to correct typos and grammar inconsistencies, to translate the conversation into different languages, etc.), can answer questions about content of a Uniform Resource Locator (URL) included in the group conversation (e.g., summarizing a news article, identifying facts mentioned in the article, can read structured data such as company earnings document, answering specific questions, etc.), can contribute to brainstorming sessions occurring in the group conversation, can act as a translation engine for translating portions of the group conversation into languages that are understandable by other members of the group conversation, can start and run games for the purpose of entertaining members in the group conversation, and so forth.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 depicts a prompt that can be provided by a computer-implemented messaging application to a bot that includes a generative model.

FIG. 5 depicts a prompt that can be provided by a computer-implemented messaging application to a bot that includes a generative model.

DETAILED DESCRIPTION

Figure 1:
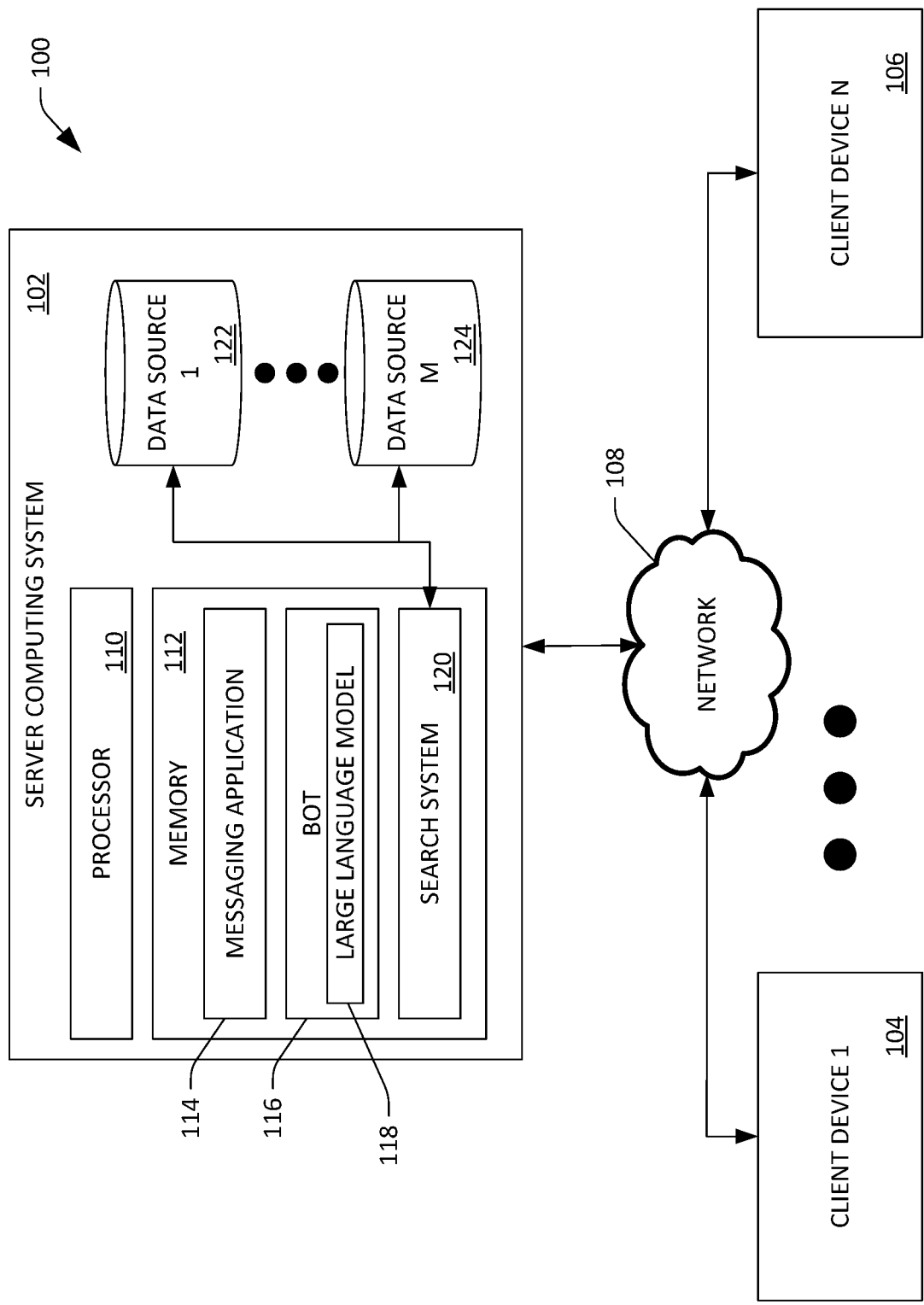
FIG. 1 is a functional block diagram of a computing system where a generative model is incorporated into a messaging application that supports group conversation.

Various technologies pertaining to incorporating functionality of a bot into a computer-implemented messaging application that supports group conversations are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality described as being carried out by certain system components may be performed by multiple components. Similarly, for instance, a component may be configured to perform functionality described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Various technologies pertaining to incorporation of a bot that includes a generative model into a computer-implemented messaging application that supports group conversations are described herein. As noted above, conventional generative models, when incorporated into chat applications, are limited to conversations with a single user. The technologies described herein are directed towards enabling a computer-implemented messaging application that supports group conversations to incorporate generative models, thereby enabling several use cases that have heretofore not been possible. As will be described in greater detail herein, the generative model can be incorporated into the messaging application, where such incorporation is enabled based upon the messaging application providing a prompt to the generative model, where the prompt identifies that the conversation is a group conversation and further includes information pertaining to the group conversation (such as identities of participants, messages previously transmitted in the group conversation, amongst other information). In another example, incorporation of the generative model into the messaging application is enabled through training the generative model to recognize that it is involved in a group conversation that includes multiple users (instead of a single user).

Referring now to FIG. 1, a functional block diagram of a computing architecture 100 that facilitates incorporation of a bot that includes a generative model into a computer-implemented messaging application that supports group messages is illustrated. The architecture 100 includes a server computing system 102 and a plurality of client computing devices 104-106. The server computing system 102 is in communication with the client computing devices 104-106 by way of a network 108, such as the Internet. While not shown, each of the client computing devices 104-106 has a client messaging application installed thereon. The computer-implemented messaging application supports synchronous messaging, and therefore can be an instant messaging application, a unified communications application, or the like. In another example, the messaging application supports asynchronous communication, and therefore can be a text messaging application. Other computer-implemented messaging applications that support group conversations are contemplated. The client messaging applications installed on the client computing devices 104-106 may be standalone applications, may be incorporated in a browser, or the like.

The server computing system 102 includes a processor 110 and memory 112, where the memory 112 includes instructions that are executed by the processor 110. As illustrated in FIG. 1, the memory 112 includes a computer-implemented messaging application 114 by way of which users of the client computing devices 104-106 can participate in a group conversation. Accordingly, in the embodiment depicted in FIG. 1, the messaging application 114 has a client-server architecture. It is to be understood, however, that functionality described herein can be used in a peer-to-peer messaging application, where a bot acts as a peer in such architecture.

The memory 112 further includes a bot 116 that comprises or has access to a generative model 118. In an example, the generative model 118 is a transformer-based model. The generative model 118 can be a GLM, such that the generative model 118 is configured to receive text input and generate text output. In such case, the bot 116 can be a chatbot. In other examples, the generative model 118 can generate audio, images, video (with audio) or other suitable outputs based upon a variety of inputs, such as voice, text, video, images, audio, etc. While the bot 116 is illustrated as being external to the messaging application 114, it is contemplated that the bot 116 may be included in the messaging application 114. As will be described in greater detail herein, the messaging application 114 receives messages from client computing devices 104-106 that are part of a group conversation between users of the client computing devices 104-106. The bot 116, through use of the generative model 118, generates output based upon the received messages and the output is provided to the client computing devices 104-106 as part of the group conversation. Hence, the bot 116 can participate in the group conversation.

The server computing system 102 also optionally includes a search system 120. With more particularity, the server computing system 102 can include several data sources 122-124 and the search system 120 can search the data sources 122-124 based upon messages included in the conversation and/or queries generated by the bot 116, where the bot 116 generates the queries based upon at least one message in the group conversation. In an example, the data sources 122-124 can be or include a search engine index, an instant answer index, an image index, a knowledge graph, a data source that stores historical information, such as previous group conversations undertaken between members of the group, a data source that includes calendar information for participants in the group conversation, amongst other information. Further, while not shown, the search system 120 can have access to external data sources, such as web servers that host websites, document repositories, and so forth.

An example operation of the server computing system 102 is now set forth. Users of the client computing devices 104-106 are taking part in a group conversation by way of the messaging application 114, such that, for example, the messaging application 114 receives a first message from the first client computing device 114 and transmits the first message to computing devices operated by users who are participating in the group conversation. Subsequently, the messaging application 114 receives an nth message from the nth client computing device 106 and transmits the nth message to the computing devices operated by the users who are participating in the group conversation.

Pursuant to an example, the messaging application 114 receives an indication that the bot 116 is to be invoked. The messaging application 114 provides the bot 116 with the first message and the nth message, as well as information related to the requested invocation of the bot 116. The bot 116 generates an output based upon the information provided to the bot 116 by the messaging application 114, and the bot 116 provides the generated output to the messaging application 114. The messaging application 114 transmits the output to the client computing devices 104-106. For instance, the output can be transmitted to the client computing devices 104-106 so that it appears as though the bot 116 were a member of the group and is participating in the group conversation with the users of the client computing devices 104-106. In addition, the bot 116 can generate the output based upon data obtained by the search system 120, where the search system 120 obtained the data by searching over data in one or more of the data sources 122-124 and/or data from external data sources.

Figure 2:
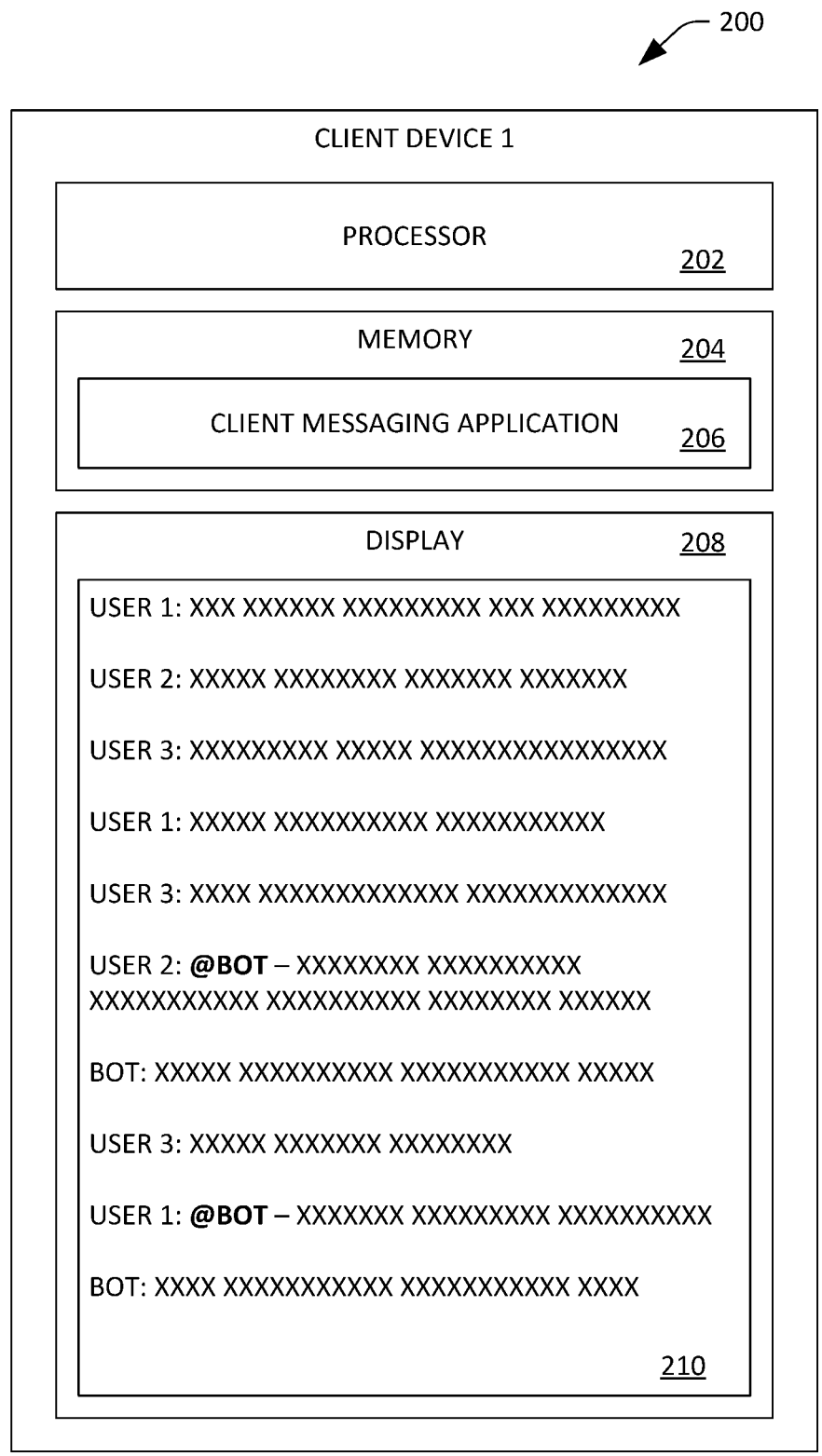
FIG. 2 is a functional block diagram of a client computing device that is displaying a group conversation that includes entries generated by a bot that uses a generative model to create output.

Now referring to FIG. 2, a functional block diagram of the first client computing device 104 is presented. The first client computing device 104 includes a processor 202 and memory 204, where the memory 204 includes a client messaging application 206. When executed by the processor 202, the client messaging application 206 establishes communications with the messaging application 114 of the server computing system 102 such that data can be transmitted between the client messaging application 206 and the messaging application 114. For example, the client messaging application 206 can receive a message that is to be included in a group conversation from the user of the first client computing device 104 and can transmit such message to the messaging application 114. Upon receipt of the message, the messaging application 114 can transmit the message to computing devices operated by other users participating in the group conversation. Similarly, upon the messaging application 114 receiving a message in the group conversation from the nth client computing device 106, the messaging application 114 can transmit the message to computing devices operated by other users participating in the group conversation (including the first client computing device 104).

The first client computing device 104 also includes a display 208, where the display 208 can depict a group conversation 210 being conducted by way of the client messaging application 206 and the messaging application 114. The group conversation 210 includes numerous messages set forth by several users who are participating in the group conversation 210. In some examples, each message is referred to as a "turn." In the example group conversation 210 depicted in FIG. 2, a first user initially sets forth a first message in the group conversation 210, followed by a second user setting forth a second message, thereafter followed by a third user setting forth a third message. The first user then contributes a fourth message to the group conversation 210, followed by the third user setting forth a fifth message to the group conversation 210. The group conversation 210 also includes a sixth message set forth by the second user, where the sixth message invokes the bot 116 and includes a request for output from the bot 116. For instance, through use of the "@" symbol followed by an identifier for the bot 116, the second user can indicate to the messaging application 114 that the bot 116 is to be invoked, and the request for output can follow the identifier for the bot 116.

The generative model 118 of the bot 116 generates output based upon the request included in the sixth message and further based upon previous messages in the group conversation 210. As illustrated in the group conversation 210, the bot 116 generates output and provides the output to the messaging application 114, which in turn transmits the output to the first client computing device 104. It is also to be noted that other participants in the group conversation can invoke the bot 116. For instance, later in the conversation, the first user indicates to the messaging application 114 that the bot 116 is to be invoked, and the generative model 118 of the bot 116 generates an output based upon several messages in the group conversation 210.

Figure 3:
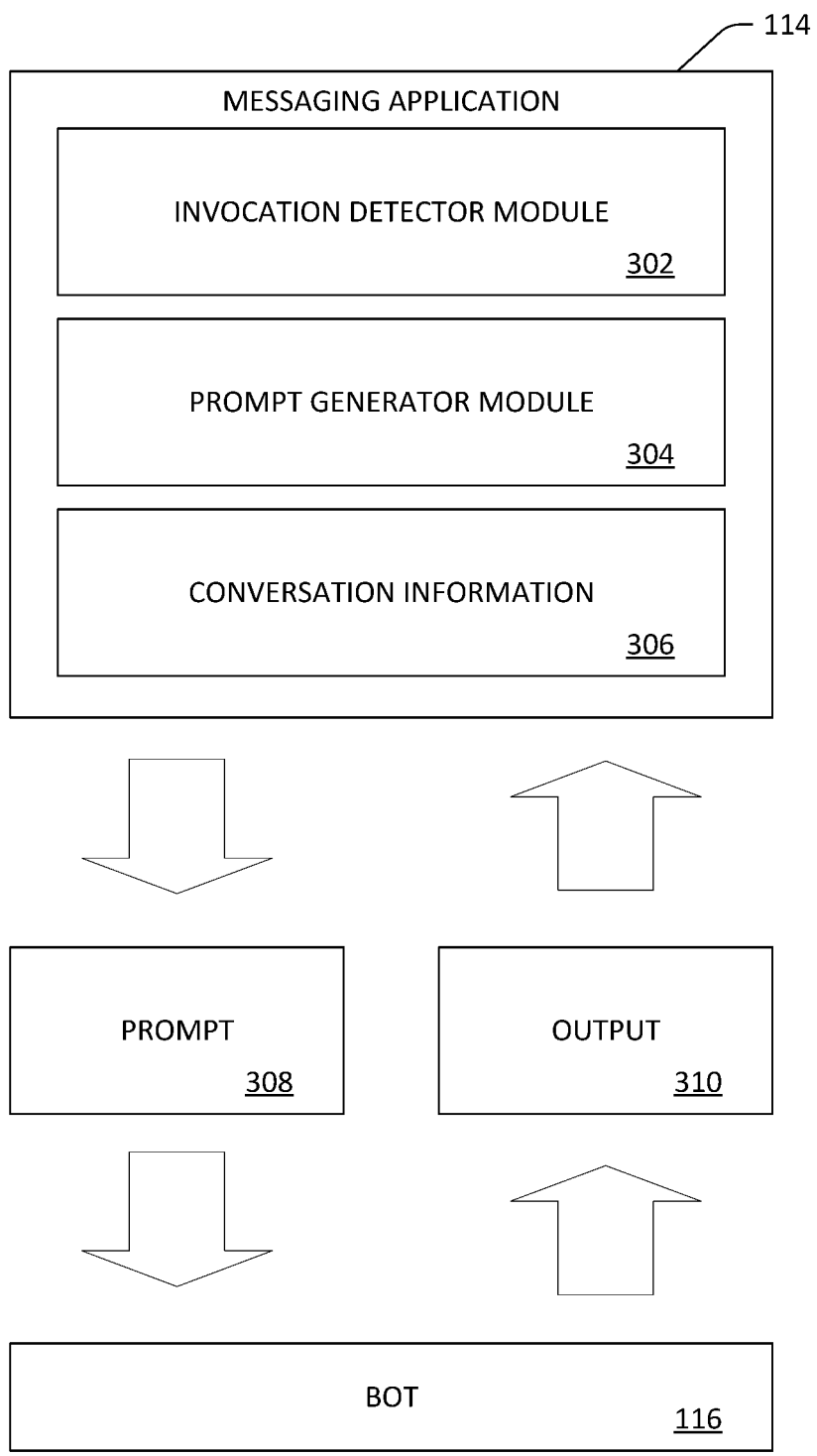
FIG. 3 is a schematic that includes a functional block diagram of a computer-implemented messaging application that supports group conversation.

Now referring to FIG. 3, a functional block diagram of the messaging application 114 is illustrated. The messaging application 114 includes an invocation detector module 302, a prompt generator module 304, and conversation information 306. As indicated previously, users in a group conversation can invoke the bot 116 (e.g., request that the bot 116 participate in the group conversation). The invocation detector module 302 can monitor a group conversation and detect a request for invocation of the bot 116 by a user participating in the group conversation. For instance, as identified above, a user can employ the "@" symbol and invoke the bot 116.

In another example, a user may set forth a voice command that requests invocation of the bot 116.

Upon the invocation detector module 302 detecting a request to invoke the bot 116, the invocation detector module 302 can inform the prompt generator module 304 that a prompt for the bot 116 is to be generated, where a prompt is input that is provided to the generative model 118, and further where the input instructs the generative model 118 as to output that is to be generated by the generative model 118. In some examples, the prompt includes text used to instruct the generative model as to output that is to be produced by the generative model 118. The prompt generator module 304 generates a prompt 308 based upon the conversation information 306. The conversation information 306 can include information such as a time when the group conversation started, identities of users in the group conversation, an indication that the conversation is a group conversation, times when messages were obtained by the messaging application 114, content of messages in the group conversation, amongst other information.

Referring to FIG. 4, an example prompt 400 output by the prompt generator module 304 is depicted. A prompt historically provided to a generative model presumes that the bot 116 is communicating directly with a single user, and that there are no other participants in the conversation. Further, such prompt includes examples for the generative model 118 to employ when responding to queries of a single user. In contrast, the prompt generator module 304, to direct the generative model 118 to understand the group conversation context, appends new instructions to a typical prompt (underneath where context for the generative model 118 talking to a user on a 1:1 basis is conventionally provided). The prompt 400 generated by the prompt generator module 304 includes an explanation that the bot 116 is in a group conversation. In addition, the prompt 400 generated by the prompt generator module 304 includes identities of users who are participating in the group conversation. Such information is important, as without the identities of the users in the group conversation the generative model 118 may become confused about who the participants are, and which participants are providing what messages when reading messages in the group conversation. To obtain the list of identities for the participants, the prompt generator module 304 can retrieve the identities from the client applications executed by the client computing devices 104-106 or by making a backend call to a roster application programming interface (API) maintained by the messaging application 114.

The prompt generator module 304 then includes a transcript of messages in the group conversation in the prompt, where the transcripts include content of the messages, timestamps that indicate when the messages were obtained by the messaging application 114, and identities of users who submitted the messages. The prompt generator module 304 also identifies the user who requested invocation of the bot 116 in the prompt 400, and optionally includes a location of the user in the prompt 400. The prompt generator module 304 can also include instructions in the prompt 400 that are to be provided to the bot 116 to restrict output of the bot 116. For instance, the instructions can indicate that the user who is requesting invocation of the bot 116 is interested in answers from the provided context of the group conversation (e.g., from the transcription of the group conversation). Further, the prompt 400 can include a request for the bot 116 to not extrapolate, to not provide personal information about people who are participating in the group conversation, to not make inferences about users participating in the group conversation, and so forth. These instructions can facilitate reduction in hallucinations output by the bot 116, as the bot 116 is limited to responding through use of information within the context.

In an example, when the bot 116 is not limited in the prompt 400 to the context, a user may set forth an invocation request to the bot 116 that includes a phrase such as "do you remember when John traveled to Australia?" Without the limiting instructions referenced above, the bot 116 may generate an output that describes a trip to Australia by John that is entirely fabricated, as the group conversation may have included no information about John making a trip to Australia.

Optionally, the prompt generator model 304 can include other information about users in the group conversation in the prompt 400, such as information retrieved from profiles of the users, including topics of interest to the users, keywords and facts mentioned by the users in other conversations, demographic information of the users (such as age) to allow the bot 116 to tailor responses, and so forth.

Returning to FIG. 3, the prompt 308 generated by the prompt generator module 304 is provided to the bot 116, which in turn provides the prompt 308 to the generative model 118. The generative model 118 generates an output 310 based upon the prompt, and the bot 116 provides the output 310 to the messaging application 114. The messaging application 114 includes the output 310 in the group conversation, such that it appears as though the bot 116 is participating in the group conversation with the other users.

Optionally, the bot 116 can interact with the search system 120 in connection with creating an updated prompt to be used by the bot 116 to generate output. In a non-limiting example, a user in the group conversation can request invocation of the bot 116 and set forth the input "we all would like to see a movie this afternoon. What time is convenient for everyone, and what movies are playing at that time?" The prompt generator module 304 can generate a prompt for the bot 116 based upon this invocation request. In this case, the prompt 308 generated by the prompt generator model 304 does not include the restriction to limit responses to the context included in the prompt 308. The generative model 118 receives the prompt 308 and based upon such prompt 308 generates queries and provides the queries to the search system 120. The search system 120 searches over one or more of the data sources 122-124 (FIG. 1) based upon the queries and provides at least some of the search results as a portion of a prompt to be employed by the generative model 118 to respond to the user request. For instance, the first data source 122 may include movie times and locations, while the mth data source 124 may include calendar information of the participants in the group message. The generative model 118 generates output 310 based upon such prompt and provides the output 310 to the messaging application 114, which includes the output 310 in the group conversation being conducted between the users of the client computing devices 104-106.

The prompt 400 is set forth as an example prompt associated with conventional generative models, where the prompt has been modified to allow for the generative model 118 to be incorporated into the messaging application 114. In other examples, the prompt generator module 304 can generate a prompt that properly describes to the bot 116 from the beginning that the bot 116 is in a multi-user group conversation.

Referring briefly to FIG. 5, another example prompt 500 that can be generated by the prompt generator module 304 is depicted. The prompt 500 is similar to the prompt 400, except that the conversation information 306 included in the prompt 500 includes outputs from the bot 116. It has been observed that when the bot 116 generates outputs based upon its own previous outputs, the subsequently generated outputs may become unpredictable, erratic, and generally undesirable. To address this issue, the prompt generator module 304 can optionally redact one or more outputs of the bot 116 that are included in the conversation information 306. A variety of approaches can be used to identify how many outputs of the bot 116 to include in the prompt 500 and/or how many outputs of the bot 116 are to be redacted. For instance, a sliding window can be employed, where only a most recent threshold number of outputs of the bot 116 are included in the prompt 500 (while other outputs are redacted). In another example, a rolling window of outputs of the bot 116 can be kept while others are redacted. An example of this rolling window is set forth below.

In an example, a threshold number of outputs of the bot 116 is 5. This means that when one of the users in the group invokes the bot 116 a sixth time, the bot 116 is provided with its past 5 replies in the prompt. When a user invokes the bot for a $7^{th}$ time, the prompt generator module 304 redacts all outputs of the bot in the prompt. This is algorithmically expressed as follows:

So resetConversationInTurn=5
Then botTurnsToKeep=previousTurnCount % (resetConversationInTurn+1)
If this is the $6^{th}$ invocation of the bot, then previousTurnCount=6−1=5, and botTurnsToKeep=5% (5+1)=5→the last 5 bot replies are included in the prompt, and other older ones are replaced with [REDACTED].
If this is the $7^{th}$ invocation of the bot, then previousTurnCount=7−1=6, and botTurnsToKeep=6% (5+1)=0→no bot outputs are included in the prompt; all bot outputs are replaced with [REDACTED]
If this is the $8^{th}$ invocation of the bot, previousTurnCount=8−1=7, botTurnsToKeep=1, so the transcript would look like:
Human A said: XXXXXXX
Human B said: YYYYY
Bot said: [REDACTED]
Human A said: @Bot QUESTION
Bot said: REPLY
Human B said: @Bot NEW QUESTION This can be illustrated in a table as follows:

| Turn Count | Number of Bot Messages to Retain (Redact Remainder) |
| --- | --- |
| 1 | 0 |
| 2 | 1 |
| 3 | 2 |
| 4 | 3 |
| 5 | 4 |
| 6 | 5 |
| 7 | 0 |
| 8 | 1 |
| 9 | 2 |

Again, FIG. 5 illustrates that the prompt 500 includes redactions of outputs of the bot 116.

The bot 116 is limited to receiving a prompt of a particular size (e.g., a threshold number of tokens). Accordingly, the prompt generator module 304 can perform one or more actions to ensure that the number of tokens in the prompt 308 provided to the bot 116 is equal to or less than the threshold such that the bot 116 can consume the prompt 308. As indicated previously, the prompt generator module 304 can include various types of information in the prompt and/or the search system 120 can include information in the prompt 308, where such information can include general instructions to the bot 116 as to how the bot 116 should generate output, including hypothetical examples of questions and answers between the bot 116 and users in the group conversation. The prompt 308 can also include JSON documents and web snippets of search results for searches that the bot 116 initiates and that are retrieved by the search system 120. The prompt 308 also includes at least some of the conversation information 306, including a transcript of the group conversation prior to the receiving the invocation request. Finally, the prompt 308 can include the request for the bot associated with the invocation.

All of this information consumes space in the prompt 308; to keep the prompt 308 within the allowed size (e.g., so that the number of tokens is less than the threshold), the prompt generator module 304 can truncate the transcript of the group conversation when the conversation becomes too long. The prompt generator module 304 can employ various different strategies when truncating the conversation transcript. In an example, the prompt generator module 304 can obtain the entire conversation transcript sorted in time from most recent to oldest. The prompt generator module 304 then goes line by line, from newest to oldest, populating a buffer having a size of a particular number of tokens (it is noted that the term "token" does not necessarily equate to a word or character, but instead refers to entities that the bot 116 has semantic understanding of, such that a token in one language may represent four characters while a token in another (more semantically dense) language may represent one character.

In an example, the prompt generator module 304 does not truncate content of any individual message set forth by a user. When the prompt generator module 304 ascertains that adding a next message in the transcript causes the token count in the buffer to exceed the particular number, the message is not added to the context. Thereafter, the prompt generator module 304 reverses the order in the buffer so that messages are arranged from oldest to newest, and the prompt generator module 304 appends the buffer to the context.

In another embodiment, as messages from the bot 116 may be relatively long, the prompt generator module 304 can request that the bot 116 truncate (summarize) its own output, thereby reducing the number of tokens needed to represent outputs of the bot 116. In another example, when tokens that represent the conversation transcript exceed the particular number, such conversation transcript can be provided as input to the bot 116 with a request to truncate (summarize) the conversation transcript (e.g., thereby reducing the transcript from X characters to Y characters, where Y is less than X). In still yet another example, the prompt generator model 304 can utilize multiple different models to truncate parts of the conversation transcript. For instance, when the conversation transcript is relatively long, the prompt generator module 304 can select the next lines, call another model to summarize the discussion, and then do the same with the next batch until all lines are exhausted.

Furthermore, to reduce computing resource usage, the messaging application 114 can be configured to identify certain bot invocations as requiring less computation while identifying other invocations as requiring more computation. For instance, the messaging the application 114 is in communication with multiple different bots, with the different bots utilizing different amounts of computing resources when generating outputs. For instance, one bot may be trained to perform only summarization, and thus require a small amount of computing resources when generating output. Conversely, a second bot may be configured to obtain information generated by the search system 120 and generate images based upon such information, thereby requiring a much larger amount of computing resources than the first bot. The messaging application 114 can identify which bot should answer the invocation request and can provide a prompt to the appropriate bot thereby preserving computing resources.

Further, as noted above, the generative model 118 may utilize a significant amount of computing resources when generating certain types of output, such as an image, music, video, etc. In some instances, users participating in a group conversation may have accounts associated with the messaging application 114, where the accounts include units of value (such as rewards points). When a user invoking the bot 116 submits a request that requires the bot 116 to utilize a significant amount of computing resources to generate an output, the account of the user can be charged for such output. For instance, a certain number of reward points can be deducted from the account of the user who invoked the bot 116. In another example, a participant in the group conversation is randomly selected and units of value are deducted from the account of the randomly selected user. In still yet another example, a round-robin approach is employed to deduct units of value from accounts of users when the bot 116 generates outputs based upon user requests.

As expressed above, the technologies described herein allow for use cases that were heretofore not possible in connection with messaging applications that allow for group conversations. For instance, the bot 116 can answer questions related to the context of the group conversation, as well as general questions. In some implementations, the bot 116 generates output only when invoked by a user who is participating in the group conversation. In another example, the bot 116 is provided with input for each turn of a group conversation, and the bot 116 decides when it would be useful to inject itself into the group conversation by generating an output. In still yet another example, the messaging application 114 is associated with a UX canvas that is displayed on the displays of the client computing devices 104-106, where the UX canvas is continuously updated with outputs of the bot 116 (where the outputs are suggestions for inclusion in the group conversation). When a user taps on a suggestion, such suggestion is entered into the group conversation as a turn (and identified as being generated by the bot 116).

The bot 116 can assist users in the group conversations with various tasks. Examples of tasks that the bot 116 can assist with include, but are not limited to: 1) summarizing the current conversation; 2) answering a question about what a person said about a topic in the conversation; 3) proposing follow up action items based upon information in the group conversation; 4) helping the group plan events, such as vacations; 5) generating images, avatars, memes, etc. pertaining to messages included in the group conversation; 6) helping to rewrite and check text that the group is working on—making text more professional, making text more humorous, fixing typos in the text, translating text to different languages, and so forth; 7) answering questions about the contents of a webpage pointed to by a URL that has been placed in the group conversation, such as summarizing news articles, identifying facts mentioned in a news article, reading structured data such as company earnings documents, answering specific questions about content of the web page, etc.; 8) brainstorming ideas, such as producing road maps for product development; 9) translating text from one language to another, such that languages of participants in the group does not matter, as the bot 116 can translate and convey information between participants in languages requested by the participants; and 10) starting and running text and image-based games to entertain users in the group conversation.

Further, the bot 116 can generate text in the output, such as answers to questions in plain text, following the flow of a conversation, and understanding pasted structured text such as tables. In another example, the bot 116 accepts audio as input, thereby allowing users to provide audio notes in the group conversation and the bot 116 can understand speech of the user using speech to text technologies. The bot 116 can reply to the input text in either text or using text to speech. The bot 116, through receipt of audio, can listen to and understand an audio/video call, can take a URL pasted into a group conversation as input, such that the bot can follow the URL, download HTML, and answer questions about contents of the page. In another example, the bot 116 accesses links to documents in shared storage spaces. With respect to output, the bot 116 can generate output in any of the modes referenced above (text, audio, images, and so forth). The bot 116 can generate output in images that it has generated, and can fill in meme templates, generate graphs, and so forth. The bot 116 can generate outputs in a tone selected by users in the group chat, and outputs of the bot 116 can be shared to other applications.

Figure 6:
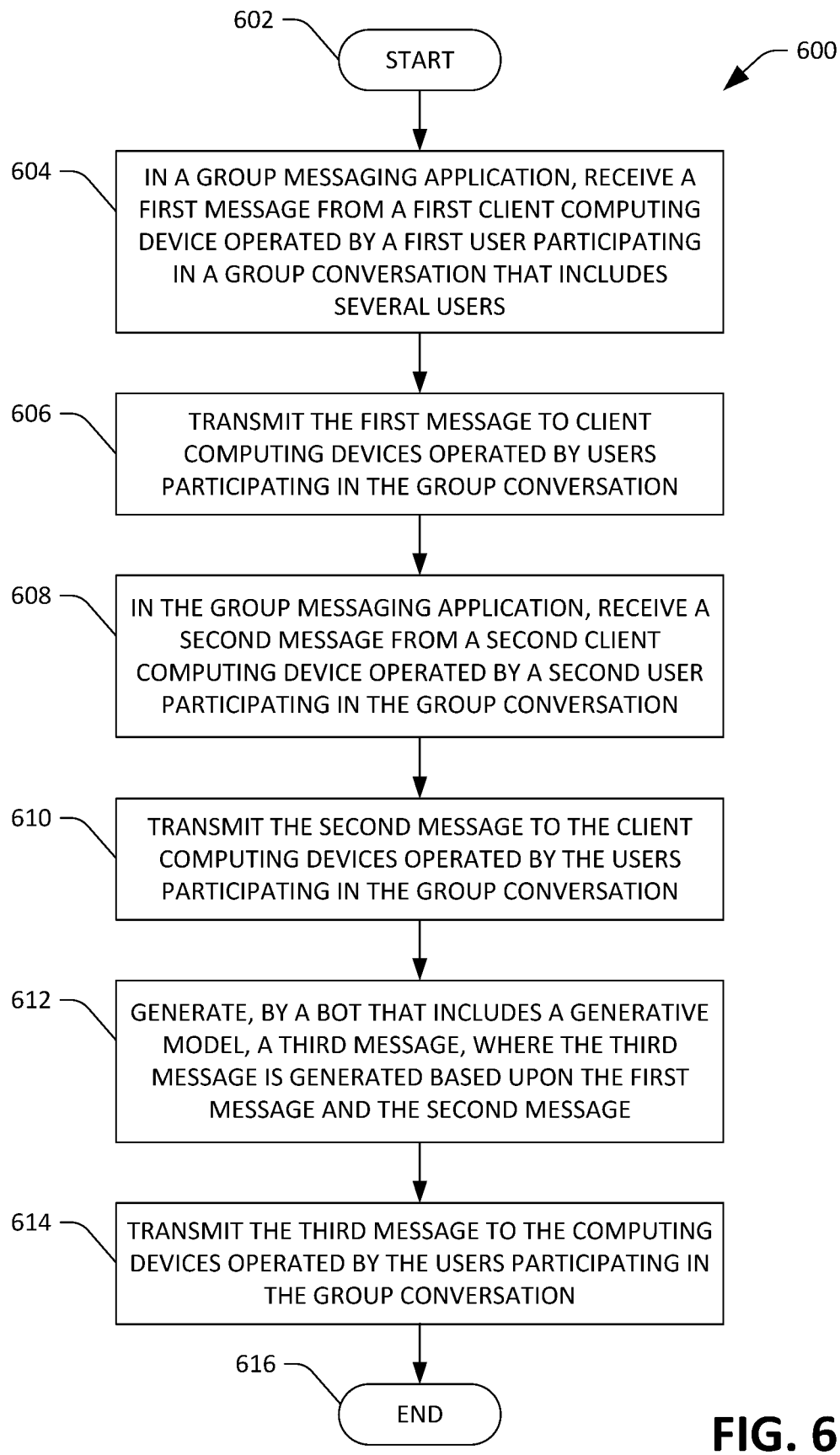
FIG. 6 is a flow diagram depicting a method pertaining to participation of a bot in a group conversation by way of a computer-implemented messaging application.
Figure 7:
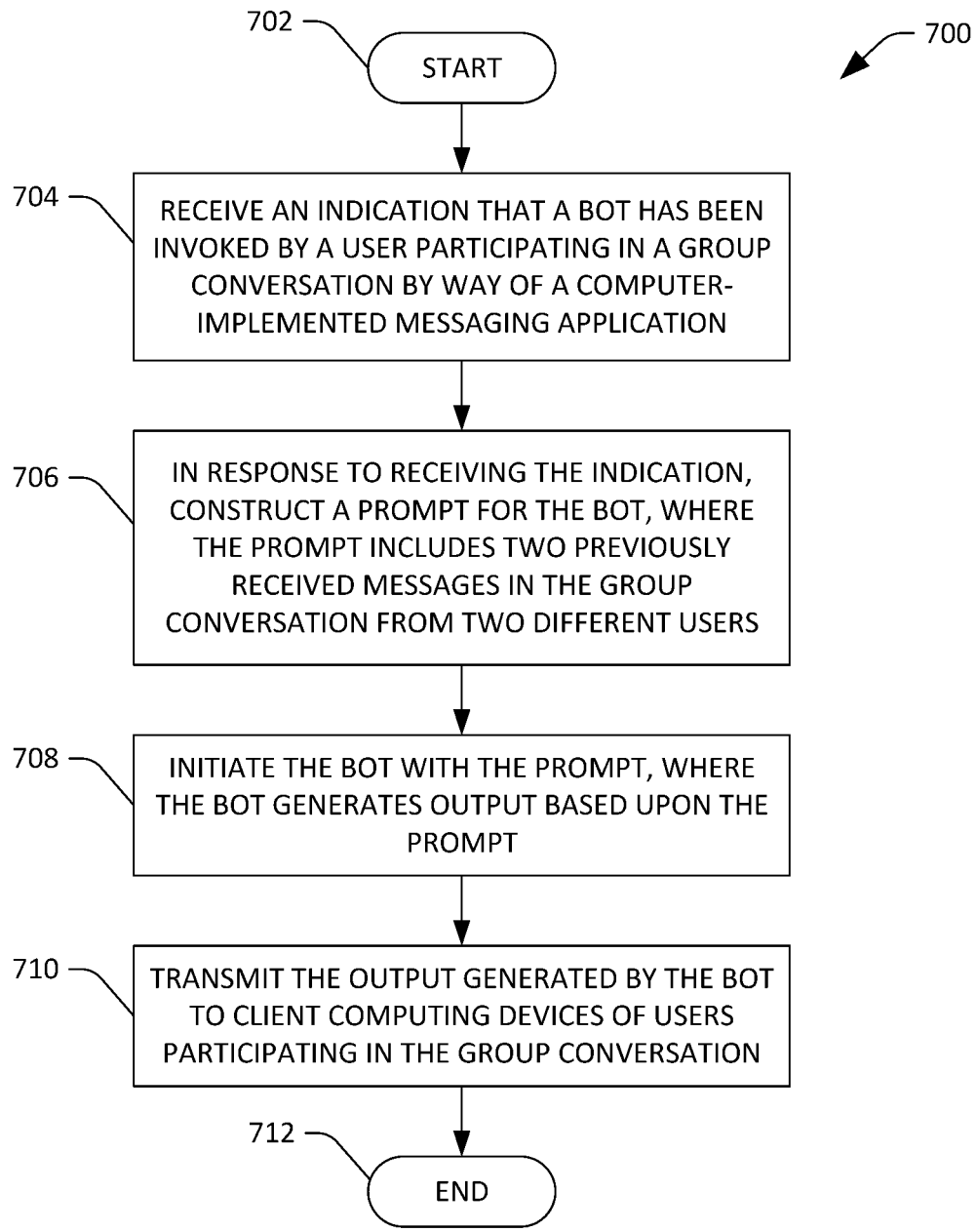
FIG. 7 is a flow diagram depicting a method for constructing a prompt that is to be provided to a bot that includes a generative model.

FIGS. 6 and 7 illustrate methodologies relating to incorporation of a generative model into a computer-implemented messaging application in accordance with one or more embodiments described herein. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now solely to FIG. 6, a flow diagram illustrating a methodology 600 that facilitates incorporation of a bot into a computer-implemented messaging application that supports group conversations is illustrated. The methodology 600 starts at 602, and at 604, in a messaging application that supports group conversation, a first message is received from a first client computing device operated by a first user participating in a group conversation that includes several other users. At 606, the first message is transmitted to client computing devices operated by users participating in the group conversation.

At 608, in the messaging application, a second message is received from a second client computing device operated by a second user participating in the group conversation. At 610, the second message is transmitted to the client computing devices operated by the users participating in the group conversation. It can therefore be ascertained that the group conversation includes messages generated by multiple users.

At 612, a third message is generated by a bot that includes a generative model, where the third message is generated based upon the first message and the second message in the group conversation (i.e., previous messages in the group conversation). In an example, as described previously, the bot generates the third message in response to receipt of an invocation request from a user who is participating in the group conversation. At 614, the third message is transmitted to the computing devices operated by the users participating in the group conversation. The methodology 600 completes at 616.

Turning now to FIG. 7, a flow diagram illustrating a methodology 700 for including output of a bot into a group conversation is illustrated. The methodology 700 starts at 702, and at 704 an indication is received that a bot has been invoked by a user participating in a group conversation by way of a computer-implemented messaging application. At 706, in response to receiving the indication, a prompt for the bot is constructed, where the prompt includes two previously received messages in the group conversation from two different users. These two previously received messages can be represented by tokens in the prompt. At 708, the bot receives the prompt, where the bot generates output based upon the prompt. At 710, the output generated by the bot is transmitted to client computing devices of users who are participating in the group conversation. The methodology 700 completes at 710.

Figure 8:
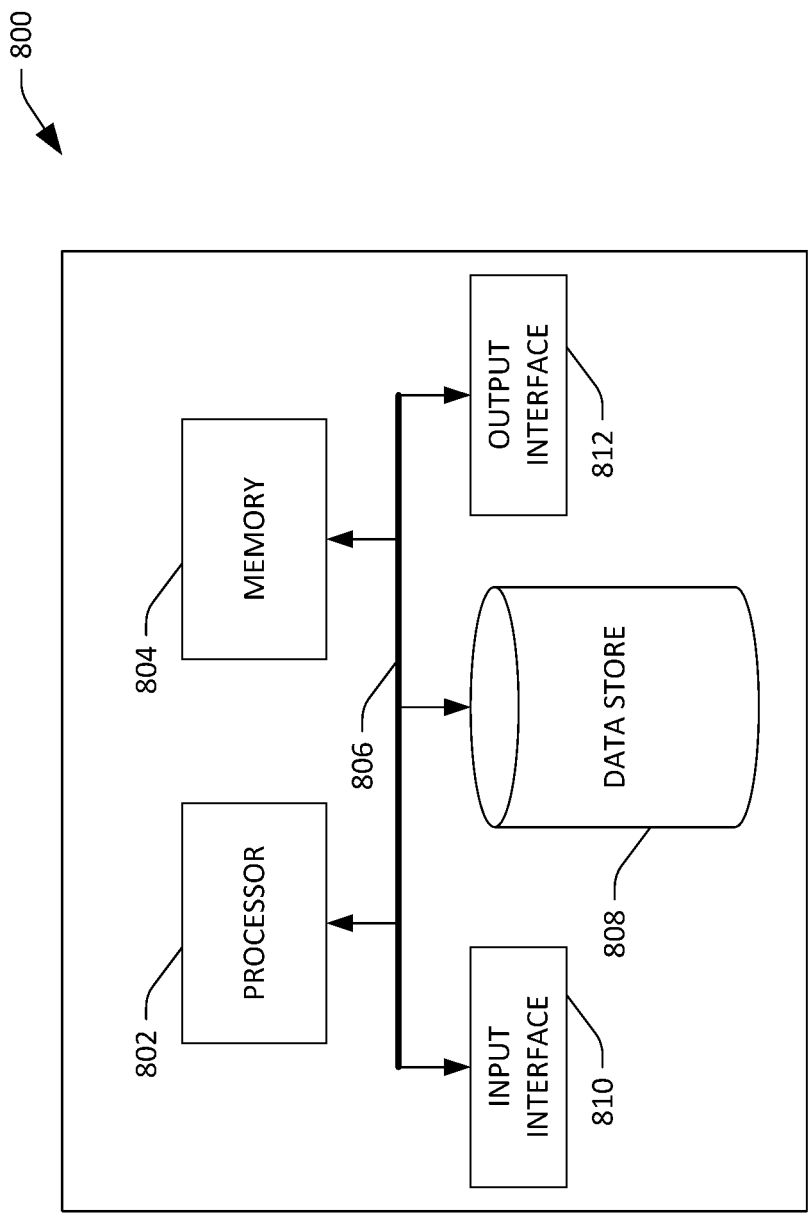
FIG. 8 is a schematic of a computing device.

Referring now to FIG. 8, a high-level illustration of an exemplary computing device 800 that can be used in accordance with the systems and methodologies disclosed herein is illustrated. For instance, the computing device 800 may be a client computing device that has a client messaging application executing thereon. By way of another example, the computing device 800 can be a server computing system that executes a server-side messaging application and/or a generative model. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store content, graphical icons, profile information, etc.

The computing device 800 additionally includes a data store 808 that is accessible by the processor 802 by way of the system bus 806. The data store 808 may include executable instructions, graphical icons, profile information, content, etc. The computing device 800 also includes an input interface 810 that allows external devices to communicate with the computing device 800. For instance, the input interface 88 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above can also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Technologies pertaining to use of a generative model in multi-user messaging contexts are disclosed herein in accordance with at least the following examples.

(A1) In an aspect, a method disclosed herein includes receiving multiple messages from multiple client computing devices operated by multiple users in a messaging application that supports group conversations, where the multiple messages are included in a group conversation. The method also includes providing a prompt to a generative model, where the prompt includes the multiple messages. The method additionally includes receiving, from the generative model, an output generated by the generative model, where the generative model generated the output based upon the prompt. The method further includes including the output as a turn in the group conversation.

(A2) In some embodiments of the method of (A1), the multiple users include a first user. The method also includes receiving a message from the first user, where the message includes a request to invoke a chatbot in the group conversation and a request for information from the chatbot. The method additionally includes detecting the request to invoke the chatbot in the message. The method further includes constructing the prompt in response to detecting the request to invoke the chatbot, where the request for information is included in the prompt.

(A3) In some embodiments of the method of at least one of (A1)-(A2), the messaging application is an instant messaging application.

(A4) In some embodiments of the method of at least one of (A1)-(A3), the method also includes constructing a transcript of messages in the group conversation. The transcript includes: 1) a first message received from a first client computing device of the multiple client computing devices; 2) a first identifier for a first user of the first client computing device, where the first identifier is assigned to the first message; 3) a second message received from a second client computing device of the multiple client computing devices; and 4) a second identifier for a second user of the second client computing device, where the second identifier is assigned to the second message. The method additionally includes constructing the prompt based upon the transcript of the messages in the group conversation.

(A5) In some embodiments of the method of (A4), the transcript also includes: 5) a third message previously generated by the generative model; and 6) a third identifier for the generative model, where the third identifier is assigned to the third message, where the prompt provided to the generative model comprises the first message, the first identifier assigned to the first message, the second message, the second identifier assigned to the second message, the third message, and the third identifier assigned to the third message.

(A6) In some embodiments of the method of (A4), the transcript of the messages in the group conversation also includes: 1) a third message previously generated by the generative model; and 2) a third identifier for the generative model, where the third identifier is assigned to the third message. The method also includes redacting the third message generated by the generative model from the transcript to create an updated transcript, where the third message is redacted based upon the third identifier being assigned to the third message, and further where the prompt comprises the updated transcript.

(A7) In some embodiments of the method of at least one of (A1)-(A6), the method also includes receiving a command to invoke the generative model from the first client computing device, where the command to invoke the generative model comprises a request for the output from the generative model, where the command is received prior to the prompt being provided to the generative model. The method additionally includes constructing a transcript of the group conversation, where the transcript comprises several messages previously generated by the generative model in the group conversation. The method further includes comparing a number of messages in the several messages to a predefined threshold. The method also includes determining that the number of messages in the several messages equals the predefined threshold. The method additionally includes redacting the several messages previously generated by the generative model in the transcript to create an updated transcript, where the prompt comprises the updated transcript, where the several messages are redacted upon determining that the number of messages in the several messages equals the predefined threshold.

(A8) In some embodiments of the method of at least one of (A1)-(A7), the prompt includes an indication that the generative model is participating in the group conversation.

(A9) In some embodiments of the method of at least one of (A1)-(A8), the method also includes obtaining identifiers for the multiple users from user profiles of the multiple users, where the identifies are obtained prior to the prompt being provided to the generative model.

(A10) In some embodiments of the of at least one of (A1)-(A9), the method also includes receiving a command to invoke the generative model from the first client computing device, where the command to invoke the generative model comprises a request for the output from the generative model, and further where the command is received prior to the prompt being provided to the generative model. The method further includes constructing the prompt based upon the request for the output, where the generative model generates a query based upon the prompt and provides the query to a search engine, where the generative model receives at least a portion of a search result identified by the search engine based upon the query, and further where the generative model generates the output based upon the at least portion of the search result identified by the search engine.

(B1) In another aspect, a method performed by a computing system that executes a messaging application includes receiving a first message in a group conversation from a first client computing device that is in communication with the computing system by way of the messaging application, where the first client computing device is operated by a first user. The method also includes receiving a second message in the group conversation from a second client computing device that is in communication with the computing system by way of the messaging application, where the second client computing device is operated by a second user. The method additionally includes constructing a prompt based upon the first message and the second message. The method further includes providing the prompt to a generative model, where a third message is generated by the generative model based upon the prompt. The method also includes transmitting the third message to the first client computing device and the second client computing device for display as part of the group conversation, where the third message is identified in the group conversation as being generated by the generative model.

(B2) In some embodiments of the method of (B1), the method also includes receiving a command to invoke the generative model from the first client computing device, where the command to invoke the generative model comprises a request for a fourth message from the generative model, where the command is received subsequent to the third message being transmitted to the first client computing device and the second client computing device. The method additionally includes constructing a second prompt based upon the command, where the second prompt includes the third message. The method further includes providing the second prompt to the generative model, where the generative model generates the fourth message based upon the second prompt. The method additionally includes transmitting the fourth message to the first client computing device and the second client computing device for presentation as part of the group conversation, where the fourth message is identified in the group conversation as being generated by the generative model.

(B3) In some embodiments of the method of at least one of (B1)-(B2), the prompt includes an identifier for the first user assigned to the first message and an identifier for the second user assigned to the second message.

(B4) In some embodiments of the method of at least one of (B1)-(B3), constructing the prompt includes: 1) constructing a transcript of the group conversation; and 2) truncating the transcript of the group conversation such that a number of tokens in the truncated transcript is less than a predefined threshold, wherein the prompt includes the truncated transcript.

(B5) In some embodiments of the method of at least one of (B1)-(B4), the method includes receiving a command to invoke the generative model from the first client computing device, where the command to invoke the generative model comprises a request for a fourth message from the generative model, and further where the command is received subsequent to the third message being transmitted to the first client computing device and the second client computing device. The method additionally includes constructing a second prompt based upon the command to invoke the generative model, where the second prompt comprises the first message and the second message but fails to include the third message. The method further includes providing the second prompt to the generative model, where the generative model generates the fourth message based upon the second prompt. The method also includes transmitting the fourth message to the first client computing device and the second client computing device for presentment as part of the group conversation, where the fourth message is identified in the group conversation as being generated by the generative model.

(B6) In some embodiments of the method of at least one of (B1)-(B5), the method also includes obtaining a first identifier for the first user and a second identifier for the second user from a first user profile and a second user profile, respectively, and where constructing the prompt comprises including the first user identifier and the second user identifier in the prompt, where the generative model generates the third message based upon at least one of the first user identifier or the second user identifier.

(B7) In some embodiments of the method of at least one of (B1)-(B6), the generative model generates a summary that summarizes the first message and the second message based upon the first message and the second message, and further where constructing the prompt comprises including the summary in the prompt.

(B8) In some embodiments of the method of at least one of (A1)-(A7), the method also includes obtaining a topic identified in a user profile of the first user, where constructing the prompt comprises including the topic in the prompt.

(C1) In another aspect, a computing system includes a processor and memory, where the memory stores instructions that, when executed by the processor, cause the processor to perform at least one of the methods disclosed herein (e.g., any of the methods of (A1)-(10) or (B1)-(B8)).

(D1) In yet another aspect, a computer readable storage medium comprises instructions that, when executed by a processor, cause the processor to perform at least one of the methods disclosed herein (g., any of the methods of (A1)-(10) or (B1)-(B8)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
   a processor; and memory storing instructions that, when executed by the processor, cause the processor to perform acts comprising:
      receiving multiple messages from multiple client computing devices operated by multiple users in a messaging application that supports group conversations, where the multiple messages are included in a group conversation;
      receiving a message from a first user of the multiple users, where the message includes a request to invoke a chatbot in the group conversation and a request for information from the chatbot;
      detecting the request to invoke the chatbot in the message;
      constructing a prompt in response to detecting the request to invoke the chatbot, where the request for information is included in the prompt;
      providing the prompt to a generative model, where the prompt includes the multiple messages;
      receiving, from the generative model, an output generated by the generative model, where the generative model generated the output based upon the prompt; and
      including the output as a turn in the group conversation.

2. The computing system of claim 1, where the messaging application is an instant messaging application.

3. The computing system of claim 1, the acts further comprising:
   constructing a transcript of messages in the group conversation, where the transcript comprises:
      a first message received from a first client computing device of the multiple client computing devices;
      a first identifier for a first user of the first client computing device, where the first identifier is assigned to the first message;
      a second message received from a second client computing device of the multiple client computing devices;
      a second identifier for a second user of the second client computing device, where the second identifier is assigned to the second message; and
   constructing the prompt based upon the transcript of the messages in the group conversation.

4. The computing system of claim 3, where the transcript of the messages in the group conversation further comprises:
   a third message previously generated by the generative model; and
   a third identifier for the generative model, where the third identifier is assigned to the third message, where the prompt provided to the generative model comprises the first message, the first identifier assigned to the first message, the second message, the second identifier assigned to the second message, the third message, and the third identifier assigned to the third message.

5. The computing system of claim 3, where the transcript of the messages in the group conversation further comprises:
   a third message previously generated by the generative model; and
   a third identifier for the generative model, where the third identifier is assigned to the third message, where the acts further comprise:
   redacting the third message generated by the generative model from the transcript to create an updated transcript, where the third message is redacted based upon the third identifier being assigned to the third message, and further where the prompt comprises the updated transcript.

6. The computing system of claim 1, the acts further comprising:
   prior to providing the prompt to the generative model, receiving a command to invoke the generative model from the first client computing device, where the command to invoke the generative model comprises a request for the output from the generative model;
   constructing a transcript of the group conversation, where the transcript comprises several messages previously generated by the generative model in the group conversation;
   comparing a number of messages in the several messages to a predefined threshold;
   determining that the number of messages in the several messages equals the predefined threshold; and
   upon determining that the number of messages in the several messages equals the predefined threshold, redacting the several messages previously generated by the generative model in the transcript to create an updated transcript, where the prompt comprises the updated transcript.

7. The computing system of claim 1, where the prompt includes an indication that the generative model is participating in the group conversation.

8. The computing system of claim 1, the acts further comprising:
   prior to providing the prompt to the generative model, obtaining identifiers for the multiple users from user profiles of the multiple users; and
   constructing the prompt to include the identifiers for the multiple users.

9. The computing system of claim 1, the acts further comprising:
   prior to providing the prompt to the generative model, receiving a command to invoke the generative model from the first client computing device, where the command to invoke the generative model comprises a request for the output from the generative model; and
   constructing the prompt based upon the request for the output, where the generative model generates a query based upon the prompt and provides the query to a search engine, where the generative model receives at least a portion of a search result identified by the search engine based upon the query, and further where the generative model generates the output based upon the at least portion of the search result identified by the search engine.

10. A method performed by a computing system that executes a messaging application, the method comprising:
    receiving a first message in a group conversation from a first client computing device that is in communication with the computing system by way of the messaging application, where the first client computing device is operated by a first user, where the first message includes a request to invoke a chatbot in the group conversation and a request for information from the chatbot;
    detecting the request to invoke the chatbot in the first message;
    receiving a second message in the group conversation from a second client computing device that is in communication with the computing system by way of the messaging application, where the second client computing device is operated by a second user;
    constructing a prompt based upon the first message and the second message, in response to detecting the request to invoke the chatbot, where the request for information is included in the prompt;
    providing the prompt to a generative model, where a third message is generated by the generative model based upon the prompt; and
    transmitting the third message to the first client computing device and the second client computing device for display as part of the group conversation, where the third message is identified in the group conversation as being generated by the generative model.

11. The method of claim 10, further comprising:
    subsequent to transmitting the third message to the first client computing device and the second client computing device, receiving a command to invoke the generative model from the first client computing device, where the command to invoke the generative model comprises a request for a fourth message from the generative model;
    constructing a second prompt based upon the command, where the second prompt includes the third message;
    providing the second prompt to the generative model, where the generative model generates the fourth message based upon the second prompt; and
    transmitting the fourth message to the first client computing device and the second client computing device for presentation as part of the group conversation, where the fourth message is identified in the group conversation as being generated by the generative model.

12. The method of claim 10, where the prompt includes an identifier for the first user assigned to the first message and an identifier for the second user assigned to the second message.

13. The method of claim 10, where constructing the prompt comprises:
    constructing a transcript of the group conversation; and
    truncating the transcript of the group conversation such that a number of tokens in the truncated transcript is less than a predefined threshold, wherein the prompt includes the truncated transcript.

14. The method of claim 10, further comprising:
    subsequent to transmitting the third message to the first client computing device and the second client computing device, receiving a command to invoke the generative model from the first client computing device, where the command to invoke the generative model comprises a request for a fourth message from the generative model;

constructing a second prompt based upon the command to invoke the generative model, where the second prompt comprises the first message and the second message but fails to include the third message;

providing the second prompt to the generative model, where the generative model generates the fourth message based upon the second prompt; and transmitting the fourth message to the first client computing device and the second client computing device for presentment as part of the group conversation, where the fourth message is identified in the group conversation as being generated by the generative model.

15. The method of claim 10, further comprising obtaining a first identifier for the first user and a second identifier for the second user from a first user profile and a second user profile, respectively, and where constructing the prompt comprises including the first user identifier and the second user identifier in the prompt, where the generative model generates the third message based upon at least one of the first user identifier or the second user identifier.

16. The method of claim 10, where the generative model generates a summary that summarizes the first message and the second message based upon the first message and the second message, and further where constructing the prompt comprises including the summary in the prompt.

17. The method of claim 10, further comprising obtaining a topic identified in a user profile of the first user, where constructing the prompt comprises including the topic in the prompt.

18. A computer-readable storage medium comprising instructions that, when executed by a processor, cause the processor to perform acts comprising:

receiving multiple messages from multiple client computing devices operated by multiple users in a messaging application that supports group conversations, where the multiple messages are included in a group conversation;

receiving, from a first user of the multiple users, a first message includes a request to invoke a chatbot in the group conversation and a request for information from the chatbot;

detecting the request to invoke the chatbot in the message;

constructing a prompt in response to detecting the request to invoke the chatbot, where the request for information is included in the prompt;

providing the prompt to a generative model, where the prompt includes the multiple messages;

receiving an output generated by the generative model based upon the prompt; and including the output as a turn in the group conversation, where the output is identified in the group conversation as having been generated by the generative model.

19. The computer-readable storage medium of claim 18, where the messaging application is an instant messaging application.

20. The computer-readable storage medium of claim 18, the acts further comprising:

constructing a transcript of messages in the group conversation, where the transcript comprises:
  a first message received from a first client computing device of the multiple client computing devices;
  a first identifier for a first user of the first client computing device, where the first identifier is assigned to the first message;
  a second message received from a second client computing device of the multiple client computing devices; and
  a second identifier for a second user of the second client computing device, where the second identifier is assigned to the second message; and constructing the prompt based upon the transcript of the messages in the group conversation.

21. The computer-readable storage medium of claim 20, where the transcript of the messages in the group conversation further comprises:
  a third message previously generated by the generative model; and
  a third identifier for the generative model, where the third identifier is assigned to the third message, where the prompt provided to the generative model comprises the first message, the first identifier assigned to the first message, the second message, the second identifier assigned to the second message, the third message, and the third identifier assigned to the third message.

\* \* \* \* \*